March 11, 1924.  1,486,339
W. E. HOKE
METHOD AND APPARATUS FOR MAKING GEARS
Filed March 20, 1919   2 Sheets-Sheet 1

Inventor
William E. Hoke
By Byrnes Townsend & Brickenstein
Attorneys

Patented Mar. 11, 1924.

1,486,339

UNITED STATES PATENT OFFICE.

WILLIAM E. HOKE, OF WASHINGTON, DISTRICT OF COLUMBIA.

METHOD AND APPARATUS FOR MAKING GEARS.

Application filed March 20, 1919. Serial No. 283,868.

*To all whom it may concern:*

Be it known that I, WILLIAM E. HOKE, a citizen of the United States, residing at Washington, in the District of Columbia, have invented certain new and useful Improvements in Methods and Apparatus for Making Gears, of which the following is a specification.

This invention relates to a method and apparatus for finishing gears, or other corrugated articles of steel or iron; and particularly relates to the manufacture of large numbers of gears or other articles, each of which is of precisely the same dimensions.

Referring to the drawings

In carrying out my invention, the articles are brought to final shape by lapping with a suitable lap, which consists of a surface of wax, wood, lead, aluminum, copper, iron, or steel having charged into its surface a suitable abradant, such as emery, alundum, carborundum, etc.

I first form what may be termed a series of master laps, which when identical precision gears are to be produced take the form of accurately identical racks.

Such racks I make by first machining or otherwise manufacturing three racks whose teeth have the desired pitch.

Rack 1 and rack 2 are then matched together and moved sidewise either to furnish bearing marks for scraping operations, or with oil and emery to lap them together; the result being that they are fitted into each other accurately by sliding them sidewise and by changing from one tooth to another and turning end to end, until rack 1 and rack 2 fit each other with precision. The same operation is then performed between rack 1 and rack 3, the result of which is that rack 2 and rack 3 are of identical form but not necessarily of accurate form; but by fitting rack 2 and rack 3 together their errors are equalized. This operation is repeated until the three racks will fit each other interchangeably, when they are manifestly precise lapping racks, from which may be generated tooth surfaces or gears of any number of teeth of the same pitch as the generating lap.

In order to form a multiplicity of identical gears, I first form by machining or otherwise, gears I of as nearly as possible accurate form, which gears may be case-hardened or otherwise hardened by well-known methods. A number of sets K of gear blanks are each mounted in a stack on a lapping rod, preferably of the form to be described hereafter.

Figure 2:
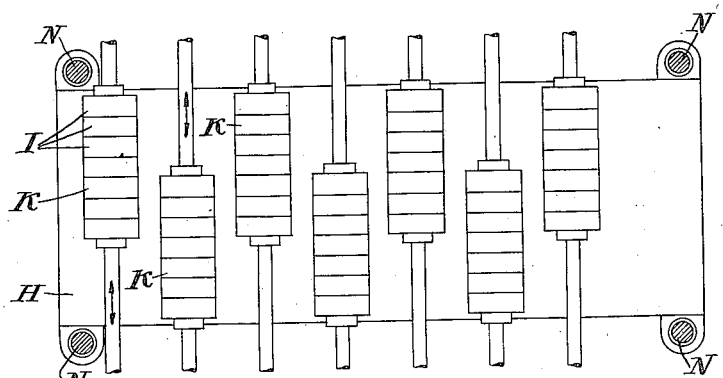
Fig. 2 is a plan of a gear lapping mechanism, the upper lap being omitted.

A number of such assemblies or stacks of gear blanks are placed upon the upper surface of the lower lapping rack H over which is placed the upper lapping rack G which rests upon and fits into the teeth of these stacks of gear blanks, the lapping racks being suitably charged or otherwise provided with abradant. The lapping operation is performed by imparting a reciprocating end motion to the upper lapping rack G which causes all of the stacks of gear blanks to rotate and to be ground or lapped by the corrugations in the lapping racks. It will be understood that the stacks of gear blanks mounted on the rods, are unrestrained except for such movements as are imparted to them by the teeth of the lapping racks, and that the individual gears are not restrained as to relative rotation to each other, except by frictional contact adjustable by a spring or otherwise. The upper lap may be weighted or spring-pressed but is not otherwise restrained against up and down movement. In order to impart a more active grinding movement than is produced by simply rolling, the various stacks of gear blanks are given a movement from side to side, as indicated in Fig. 2 by arrows, each alternate stack being actuated in opposite direction.

This side to side movement of the stacks of gears is performed simultaneously with the end movement of the upper rack, producing a diagonal grinding or lapping operation on the faces of all of the teeth of each and every one of the gear blanks, and at the same time when a special lapping rod is used, simultaneously laps the center hole through the gear blanks to perfect diameter and roundness. After this lapping operation has proceeded for an interval of time, the upper lap is removed and each alternate gear blank is rotated upon its center axis 180°, and each alternate stack of gear blanks is transposed to a corresponding position at the other end of the lapping rack and is also turned end for end, the purpose being to symmetrically distribute the errors throughout the entire surface of operation. After this has been done, the upper lap is again placed into position and the gear blanks lapped for another interval of time. This interchanging operation is repeated from time to time which results in the generation of gear teeth having theoretically perfect involute, cycloid or other curves, depending upon the character of lapping rack being used. Either spur or spiral gears may thus be made, by using a lapping rack having its teeth at the proper angle.

The final result is to produce identical size in each and every one of the gear blanks and to exactly center the latter.

The method of measuring the gears thus produced is to mesh them into each other in a straight row upon a plane surface and measure the combined length of the whole or a convenient number of them by means of pins accurately fitting the center holes of the two end blanks of the row. For instance, if one-inch gears are being made, and 37 of such gears are placed into mesh side by side upon a plane surface in a row, the center holes of the two end gears should be exactly one yard apart, center to center. In the event that the gears are too large, some one of them will knuckle up or if they are too small there will be back-lash or lost motion when rotated. In the event they are too large they are put back into the machine and again lapped until of the desired size.

Figure 3:
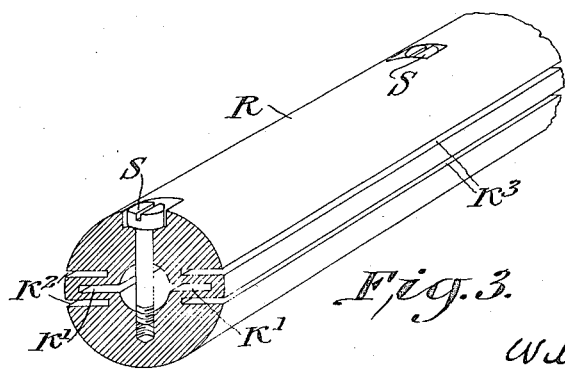
Fig. 3 is a sectional perspective view of an expansible lapping mandrel.

The special lapping rods are preferably made as shown in Fig. 3, and may each consist of a cylindrical rod R having a central aperture, on each side of which are cut narrow grooves $K^1$, $K^2$, $K^3$, a series of screws S being located as shown. By setting up or slackening the screws, the effective diameter of the lapping rod may be slightly changed. The resiliency of the metal may be sufficient to maintain the lap in distended form, but it is preferred to use hydrostatic pressure, as by oil under pressure, which oil may contain abrasives in suspension, which will leak around the screw-heads and furnish the desired lubricant. The rod when properly charged with abradant is then ready for use. When it is desired to lap the central holes simultaneously with the curves of the teeth, the rods are held stationary and the stacks of gears are moved sidewise along the rods and thus have their center holes lapped to perfect diameter and roundness, with their axes exactly normal to the sides of the blank. When it is not desired to lap the center holes, the blanks may be held on the rods against longitudinal movement by any suitable means.

By the method of symmetrically distributing the errors above described, all essential dimensions of the gears are lapped to precise and exact dimensions by a simultaneous operation. If the operation is about completed, and it is desirable to have the grain on the face of the teeth run circumferentially, the sliding movement of the stacks is retarded to a very slow movement while the reciprocating movement of the upper lap is performed at its usual speed, the result being that the faces of the teeth are bright, polished and have the grain running in the direction in which friction occurs when the gears are meshed together for use.

In none of the lapping operations which have been described, is the lapping surface confined to restrain its grinding action. The lap, which may, of course, be weighted if desired is allowed to rest upon the surface of the multiplicity of articles and thus acts only to remove upstanding inequalities wherever they occur in the whole group of articles. By the repeated transposition and interchange, such inequalities are gradually removed, until all the separate surfaces, no matter how much they are interchanged, are brought into final register or accord. The articles or blanks themselves are thus the guide for the lap.

In other words, the surface made up of the surfaces of all the articles has inequalities, and because of the possibility of interchanging and transposition of the component parts of this aggregate surface, I can and do utilize the blanks themselves as gauges for determining the point when exact similarity is reached.

While I have described certain methods of transposition of the articles being worked upon, many other methods may be followed, depending upon the article being made. Thus, in the manufacture of gears as above described, it is desirable, particularly when the center holes are being lapped simultaneously with the lapping of the teeth surfaces, to transpose each alternate gear in the stack face for face, as well as to transpose the gears in their relative position in the stack and to rotate them on their axes to a different angular position.

The opposite faces of the gears or their hubs may be brought into parallelism, prior to the lapping operation above described, and when this is done, the holes in the gears will all be of the same size and at right angles to the side faces and necessarily exactly centred.

An extension or modification of the same mode of procedure may be applied to the production of noiseless intermeshing gears.

A very prolific cause of noise in gears is due to the fact that the gear teeth bend under strain. The bending of the two teeth in contact results in the point of the next tooth, as it comes into mesh, striking, instead of sliding into mesh. For this reason many gears which are practically noiseless when running idle become noisy under load.

By properly proportioning the teeth of the rack the proper correction may be applied to the involute curve of gear teeth, whereby this noise may be eliminated and power saved.

In order to do this it is only necessary to make the pitch or distance from center to center of the teeth in the lapping rack somewhat less than the circular pitch of the gear. This distance should preferably be twice the amount of bend in any one tooth under the load which the tooth will have to stand in action. This shortening of the pitch should be employed entirely in the reduction of the width of the rack teeth themselves, leaving the tooth space of the rack of normal pitch. The object of this is to allow the tooth space in the rack to straddle the gear tooth without lapping it too thin, but that when the next tooth of the lapping rack comes into mesh with the next tooth of the gear, it will strike the gear tooth at the point and lap it into a curve which will automatically provide for the bending of the teeth under strain, thereby applying in a very natural and easy remedy for what is otherwise a very involved problem. In considering this it must be kept in mind that the gears being lapped are perfectly free to move in the lapping rack, being only restrained by the form and dimensions of the rack and not held by any fixed axis or caused to revolve in any fixed manner which would of course prevent a gear of one pitch from meshing properly with the teeth of the rack of a lesser pitch.

Figure 4:
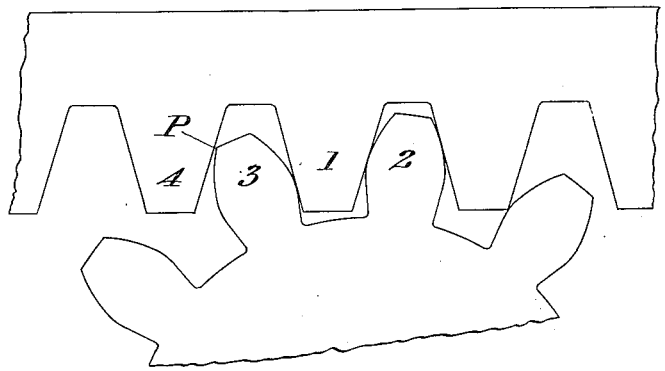
Fig. 4 shows an intermeshing rack and gear of usual dimensions.
Figure 5:
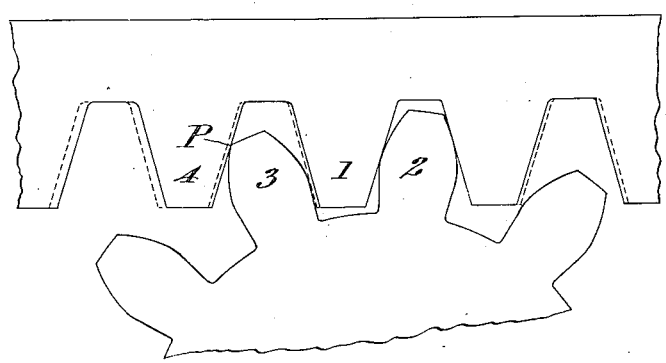
Fig. 5 shows my modified form of rack.

This modification of the tooth curves will be understood by an examination of Figs. 4 and 5. In Fig. 4, in which the teeth of the rack have the same pitch as the teeth of the gear, it will be noted that at the point P, there is some clearance; but if the teeth 1 and 2 bend under the strain of the load, the tooth 4 may strike the gear tooth at the point P, instead of sliding into mesh. Accordingly, by lessening the pitch of the teeth of the lapping rack by the necessary amount as shown in Fig. 5, in which the original dimensions are indicated in dotted lines, the points of the teeth at point P will be rounded or "dubbed" off, so that when under load, the gear will slide into mesh without clashing. It will be understood, that, except at the corners, the tooth surfaces will still be accurate involute or other curves.

It will be further understood that gears are reversibly symmetrical and that the equal spacing of the gear teeth is not produced by the equal spacing of the rack teeth, but results from the interchanging and reversal of position in the manner already described, by which the accurate spacing and concentricity of the teeth surfaces is obtained.

The term "lapping rack" as used in the claims also includes circular or annular toothed gears having either external or internal teeth, as I have in my application filed concurrently herewith described a method in which the same principle of operation as herein disclosed is applied to lapping into final shape an internal gear blank by an external gear lap and vice versa.

I have not described the details of the lapping operation as the particular abradants and lubricants or cutting fluids used, the manner of charging the laps etc., are all well known to those skilled in the art, and are used by me in performing the lapping operations described, in accordance with the requirements of each particular case.

Figure 1:
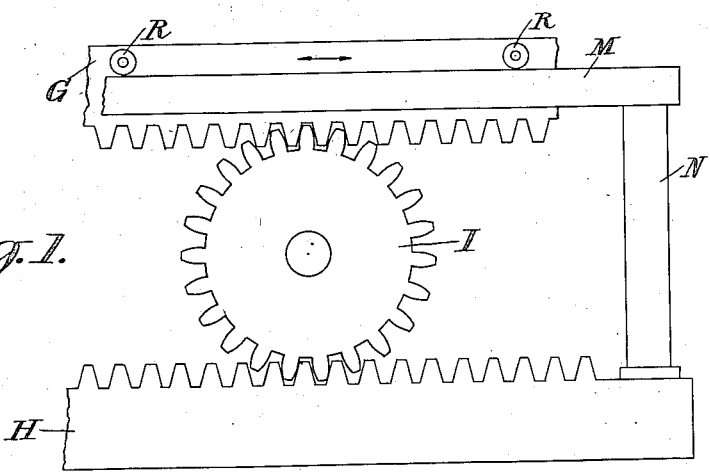
Fig. 1 is an elevation of a gear lapping mechanism.

The method above described applies in the main to the manufacture of precision gears, but in cases where no more than commercial accuracy is required, I may provide a stop to limit the downward movement of the upper lap. As shown in Fig. 1, there may be provided supporting rails or other devices M against which contact rollers or other cooperating devices R, R, on the upper lap, the rail being supported in any desired manner as by pillars N. These rails are preferably made capable of adjustment. Where such support stops are used, it is unnecessary to change the relative positions of the stacks of blanks, but the relative revolving and interchanging of position of the blanks in the stack should be performed to insure correct spacing and concentricity of the teeth.

The terms "lap" and "lapping" are intended to include not only abrading with surfaces charged with abrasive, but also other abrading action.

I claim:

1. The method of finishing gears which consists in intermeshing a number of toothed gear blanks mounted on a common axis and held in frictional engagement, with a toothed lap having suitably shaped teeth, maintaining the lap and gear blanks in yielding engagement, causing relative longitudinally reciprocating movement between the lap and the gear blanks whereby the gear blanks are rotated, said gear blanks being also capable of other bodily movement except as they are restrained by the teeth of the toothed lap, and continuing the lapping until the gears are brought to finished form.

2. The method of finishing gears which consists in intermeshing a number of toothed gear blanks mounted on a common axis and held in frictional engagement with a toothed lap having suitably shaped teeth, maintaining the lap and the gear blanks in yielding engagement, causing relative longitudinally reciprocating movement between the lap and the gear blanks whereby the gear blanks are rotated, said gear blanks being also capable of other bodily movement except as they are restrained by the teeth of the toothed lap, simultaneously moving said gear blanks transversely, and continuing the lapping until the gears are brought to finished form.

3. The method as claimed in claim 2 in which a number of sets of gear blanks are simultaneously lapped.

4. The method as claimed in claim 2 in which a lapping rack is used.

5. The method of finishing gears which consists in intermeshing a number of toothed gear blanks mounted on a common axis with a pair of lapping racks, imparting relative longitudinally reciprocating movement to the racks, one of the racks being held in yielding engagement with the gear blanks, said gear blanks being also capable of other bodily movement except as they are restrained by the teeth of the racks, and continuing the lapping until the gears are brought to finished form.

6. The method of finishing gears which consists in intermeshing a number of toothed gear blanks mounted on a common axis with a pair of lapping racks, imparting relative longitudinally reciprocating movement to the racks, one of the racks being held in yielding engagement with the gear blanks, said gear blanks being also capable of other bodily movement except as they are restrained by the teeth of the racks, simultaneously moving said blanks transversely, and continuing the lapping until the gears are brought to finished form.

7. The method as claimed in claim 2 comprising the re-arrangement of the gear blanks during the lapping operation by rotating some of them to a different relative angular position.

8. The method as claimed in claim 2 comprising the re-arrangement of the gear blanks during the lapping operation by interchanging their relative positions.

9. The method as claimed in claim 2 comprising the re-arrangement of the gear blanks by turning the gear blanks face for face during the lapping operation.

10. The method as claimed in claim 7 which includes also interchanging the relative positions of the gear blanks.

11. The method as claimed in claim 10 which includes also turning the gear blanks face for face.

12. The method as claimed in claim 2 which comprises transposition in relative position of the sets of gear blanks during the lapping operation.

13. The method as claimed in claim 12 comprising also the re-arrangement of the gear blanks by interchanging their relative position in the sets.

14. The method as claimed in claim 12 comprising also the re-arrangement of the gear blanks by turning them face for face.

15. The method as claimed in claim 7 which includes interchanging the relative positions of the gear blanks.

16. The method as claimed in claim 15 which includes also turning the gear blanks face for face.

17. The method as claimed in claim 1 in which the teeth of the lapping rack are of sufficiently less pitch than the circular pitch of the gears whereby the upper corners of the gear teeth are ground off thereby producing noiselessly intermeshing gears.

18. The method as claimed in claim 1 in which the teeth of the lapping rack are of less pitch than the circular pitch of the gears by twice the amount of bend in any one tooth when under a given load whereby the upper corners of the gear teeth are ground off, thereby producing noiselessly intermeshing gears.

19. The method of finishing the teeth of a plurality of hardened gear blanks which consists in imparting a relative rotating and reciprocating movement to said blanks and to a toothed lap having suitably shaped teeth while in yielding pressure intermesh with the teeth of the blanks.

20. The method as claimed in claim 6 comprising the re-arrangement of the gear blanks during the lapping operation by rotating some of them to a different relative angular position.

21. The method as claimed in claim 6 comprising the re-arrangement of the gear blanks during the lapping operation by interchanging their relative position.

22. The method as claimed in claim 6 comprising the re-arrangement of the gear blanks by turning the gear blanks face for face during the lapping operation.

23. The method as claimed in claim 21 which includes also interchanging the relative positions of the gear blanks.

24. The method as claimed in claim 23 which includes also turning the gear blanks face for face.

25. The method of finishing gears which consists in intermeshing a number of toothed gear blanks with a toothed lap having suitably shaped teeth, imparting a relative movement between the gear blanks and the lap in a direction transverse to the lap teeth, and also a relative movement between the gear blanks and the lap in a direction parallel to the axis of the gear blanks.

In testimony whereof I affix my signature.

WILLIAM E. HOKE.